United States Patent
Nelson et al.

[19]

[11] Patent Number: 5,999,308

[45] Date of Patent: Dec. 7, 1999

[54] METHODS AND SYSTEMS FOR INTRODUCING ELECTROMAGNETIC RADIATION INTO PHOTONIC CRYSTALS

[75] Inventors: Keith A. Nelson, Newton; John Joannopoulos, Belmont, both of Mass.

[73] Assignee: Massachusetts Institute of Technology, Cambridge, Mass.

[21] Appl. No.: 09/053,160

[22] Filed: Apr. 1, 1998

[51] Int. Cl.⁶ .................................. G02F 1/01; G02F 1/03
[52] U.S. Cl. .......................... 359/321; 359/237; 359/238; 359/326; 359/332
[58] Field of Search .................................... 372/21, 22, 23, 372/45, 50; 385/2, 8, 9, 14; 359/326, 344, 332, 342, 245, 248, 321, 322; 333/219.1, 202; 356/345, 432

[56] References Cited

U.S. PATENT DOCUMENTS

| | | | |
|---|---|---|---|
| 5,187,461 | 2/1993 | Brommer et al. | 333/219.1 |
| 5,389,943 | 2/1995 | Brommer et al. | 343/909 |
| 5,406,573 | 4/1995 | Ozbay et al. | 372/43 |
| 5,440,421 | 8/1995 | Fan et al. | 359/344 |
| 5,471,180 | 11/1995 | Brommer et al. | 333/202 |
| 5,526,449 | 6/1996 | Meade et al. | 385/14 |
| 5,600,483 | 2/1997 | Fan et al. | 359/344 |
| 5,684,817 | 11/1997 | Houdre et al. | 372/45 |
| 5,748,057 | 5/1998 | De Los Santos | 333/134 |
| 5,818,309 | 10/1998 | De Los Santos | 333/176 |

OTHER PUBLICATIONS

Milosavljevic et al., "Three Dimensional Optical Storage Inside Transparent Materials," Optical Letters, Dec. 15, 1996, vol. 21, No. 24, pp. 2023–2025.

*Primary Examiner*—Georgia Epps
*Assistant Examiner*—Margaret Burke
*Attorney, Agent, or Firm*—Fish & Richardson P.C.

[57] ABSTRACT

A method for introducing desired electromagnetic radiation into a photonic crystal having a photonic bandgap and at least one defect, wherein the desired electromagnetic radiation has a frequency within the photonic bandgap. The method includes the steps of: delivering source electromagnetic radiation having an electromagnetic frequency outside the photonic bandgap to the defect; and generating the desired electromagnetic radiation at the defect in response to the source electromagnetic radiation.

35 Claims, 7 Drawing Sheets

METHODS AND SYSTEMS FOR INTRODUCING ELECTROMAGNETIC RADIATION INTO PHOTONIC CRYSTALS

BACKGROUND OF THE INVENTION

This invention relates to optoelectric devices, their methods of use, and, in particular, methods of using photonic crystals.

Photonic crystals are structures having a periodic variation in dielectric constant. A one-dimensional example of a photonic crystal is an alternating stack of dielectric layers, which includes the well-known "quarter-wave stack" dielectric mirror. Light of the proper wavelength at normal incidence to such a mirror is completely reflected by the mirror. One description of the basis for this complete reflection is destructive interference between multiply-scattered waves of light inside the stack. An alternative description is that the solutions for propagating electromagnetic (EM) modes within the periodic stack give rise to a photonic "band" structure, in which propagating EM modes having frequencies within a "photonic bandgap" cannot exist within the periodic stack. EM waves having these frequencies are therefore completely reflected by the stack when incident on the stack. This band theory for EM waves is analogous to the band theory developed for electrons in crystals.

In general, the position and width of a photonic bandgap will depend on the propagation direction of the propagating EM wave and its polarization. In multi-dimensional photonic crystals (i.e., materials having a periodic dielectric constant along more than one dimension), a photonic bandgap can exist over a larger range of propagation directions. For example, a three-dimensional (3D) photonic crystal, such as a solid structure formed from dielectric spheres at the sites of a diamond lattice, can have a "complete photonic bandgap". Within such a photonic crystal, no propagating EM modes having frequencies within the complete photonic bandgap can propagate, regardless of propagation direction and polarization.

By fabricating photonic crystals having specific periodicities, the properties of the photonic bandgap can be tailored to specific applications. For example, the central wavelength of a photonic bandgap is approximately equal to the periodicity of the photonic crystal and the width of the photonic bandgap is proportional to the differences in dielectric constant within the photonic crystals. For a general reference, see: J. D. Joannopoulos et al., *Photonic Crystals*, (Princeton University Press, Princeton, 1995), the contents of which are incorporated herein by reference.

Photonic crystals can also include defects with respect to their periodicity that support a localized electromagnetic mode having a frequency within a photonic bandgap. For example, in a three-dimensional photonic crystal formed from dielectric spheres at the sites of a diamond lattice, the absence of a sphere produces a defect. In the immediate vicinity of the absent sphere, the photonic crystal is no longer periodic, and a localized electromagnetic mode having a frequency within the photonic bandgap can exist. This defect mode cannot propagate away from the absent void, it is localized in the vicinity of the defect. Thus, the introduction of a defect into the photonic crystal creates a resonant cavity, i.e., a region of the crystal that confines EM radiation having a specific frequency within the region. Resonant cavities are used in optical devices such as lasers and light-emitting diode displays, as well as components for microwave and millimeter wave applications, such as filters and power generators. Brommer et al. describes fabricating such devices by introducing defects into photonic crystals in U.S. Pat. Nos. 5,187,461, 5,389,943 and 5,471,180, the contents of which are incorporated herein by references. In these applications, separate dielectric waveguides channel the confined EM radiation into, and away from, the defect region.

In other applications, a photonic crystal includes a series of defects that combine to form a waveguide within the photonic crystal. The series of defects support EM modes having frequencies within the photonic bandgap that can propagate along the series of defects but are otherwise confined to regions of the photonic crystal in the vicinity of these defects. Defect-based waveguides in photonic crystals can include sharp turns since the photonic bandgap can prevent propagation of the EM radiation away from the waveguide for at least some, if not all, propagation directions. Waveguides based on photonic crystals and incorporated into optoelectronic integrated circuits are described by Meade et al. in U.S. Pat. No. 5,526,449, the contents of which are incorporated herein by reference.

SUMMARY OF THE INVENTION

The invention features a method for introducing electromagnetic (EM) radiation having a frequency within the photonic bandgap of a photonic crystal into a defect in the photonic crystal. The method involves directing source EM radiation having a frequency outside the photonic bandgap into the photonic crystal so that it generates the EM radiation having a frequency within the photonic bandgap through a non-linear interaction with the photonic crystal in the vicinity of the defect. The non-linear interaction can include harmonic generation, sum-frequency mixing, difference-frequency mixing, optical rectification, electro-optic effect, and stimulated light scattering including impulsive stimulated scattering. The source EM radiation can include any one or more of the following: continuous wave radiation, pulsed radiation of any duration, single or multiple beams, single or multiple EM frequencies, a spatially-structured amplitude and/or phase profile, a temporally-structured amplitude and/or phase profile, and a frequency-structured amplitude and/or phase profile.

The method addresses an important issue relating to photonic crystals devices that have a defect-based resonant cavity or waveguide, which is how to introduce EM radiation that would be confined by the defect-based cavity or waveguide into the defect-based cavity or waveguide. The defect-based cavity or waveguide confines EM radiation when the EM radiation has frequency within the photonic bandgap of the photonic crystal. However, this photonic bandgap also prevents the EM radiation from propagating through the photonic crystal, thereby preventing the EM radiation from reaching the defect-based cavity or waveguide. According to the method of the invention, EM radiation having a frequency outside the photonic bandgap is propagated through the photonic crystal to reach the vicinity of the defect-based cavity or waveguide. Once there, it generates (through a non-linear interaction) EM radiation having a frequency that is within the photonic bandgap, which confines this newly-generated EM radiation to the defect-based cavity or waveguide.

Similarly, the invention also features a method for detecting EM radiation that is confined to a defect in a photonic crystal and has a frequency within the photonic bandgap of the photonic crystal. The method involves directing probe EM radiation having a frequency outside the photonic bandgap toward the defect and detecting signal EM radiation that has a frequency outside the photonic bandgap and is generated through a non-linear interaction between the probe EM radiation, the confined EM radiation, and material in the vicinity of the defect. Thus, detection of the signal EM radiation is indicative of the presence of the confined EM radiation within the defect. Depending on the non-linear mechanism, the signal EM radiation can have a propagation direction, polarization, frequency, or temporal, spatial, or frequency amplitude and/or phase profile that is different than the propagation direction, polarization, frequency, or temporal, spatial, or frequency amplitude and/or phase profile of the probe EM radiation. Detection of the signal EM radiation can be based on any one of these differences. Suitable non-linear mechanisms for detecting EM radiation confined to a defect of a photonic crystal include any of those used for generating EM radiation confined to a defect of a photonic crystal, such as those described above.

In general, in one aspect, the invention features a method for introducing desired electromagnetic radiation into a photonic crystal having a photonic bandgap and at least one defect, wherein the desired electromagnetic radiation has a frequency within the photonic bandgap. The method includes the steps of: delivering source electromagnetic radiation having an electromagnetic frequency outside the photonic bandgap to the defect; and generating the desired electromagnetic radiation at the defect in response to the source electromagnetic radiation.

Preferred embodiments may have any of the following features. The desired electromagnetic radiation is generated through a non-linear interaction between material in the vicinity of the defect and the source electromagnetic radiation. The non-linear interaction is harmonic generation, sum frequency mixing, difference frequency mixing, optical rectification, electro-optic effect, stimulated Raman scattering, and impulsive stimulated Raman scattering. The source electromagnetic radiation is delivered from a coherent source. The source electromagnetic radiation has a bandwidth greater than the frequency of the desired electromagnetic radiation, e.g., a bandwidth greater than 1 THz. The source electromagnetic radiation has a peak intensity greater than $1 \times 10^6$ W/cm$^2$, greater than $1 \times 10^8$ W/cm$^2$, or greater than $1 \times 10^{10}$ W/cm$^2$. The photonic crystal includes a ferroelectric material, e.g., PbTiO$_3$, KNbO$_3$, LiTaO$_3$, BaTiO$_3$, KTN, PZT, and PLZT. The defects in the photonic crystal includes a void. The method further includes the step of filling the void with index-matching fluid for the source electromagnetic radiation to prevent scattering of the source electromagnetic radiation. The frequency of the source electromagnetic radiation is within the visible and near-infrared region of the electromagnetic spectrum and the frequency of the desired electromagnetic radiation is in the near-infrared and infrared region of the electromagnetic spectrum. The defects includes a series of defects arranged to form a waveguide. At least one of the defects forms a cavity.

In general, in another aspect, the invention features a method for detecting electromagnetic radiation that is confined to at least one defect in a photonic crystal and has a frequency within the photonic bandgap of the photonic crystal. The method includes the steps of: directing probe electromagnetic radiation having a frequency outside the photonic bandgap toward the defect; generating signal electromagnetic radiation that has a frequency outside the photonic bandgap through an interaction between the probe electromagnetic radiation, the confined electromagnetic radiation, and material in the vicinity of the defect; and detecting the signal electromagnetic radiation to indicate the presence of the confined electromagnetic radiation.

Preferred embodiments may have any of the following features. The interaction is a non-linear interaction, which may include harmonic generation, sum frequency mixing, difference frequency mixing, optical rectification, electro-optic effect, stimulated Raman scattering, impulsive stimulated Raman scattering, and optical Kerr effect. The probe electromagnetic radiation has a peak intensity greater than $1 \times 10^6$ W/cm$^2$. The probe electromagnetic radiation is delivered from a coherent source. The defect includes a series of defects arranged to form a waveguide. At least one of the defects forms a cavity. The detecting step includes detecting a heterodyne signal, which may be produced from heterodyned optical Kerr effect.

In general, in a further aspect, the invention features an optical system including: a photonic crystal having a photonic bandgap and at least one defect within the photonic crystal, wherein the defect supports desired electromagnetic radiation having a frequency within the photonic bandgap; and a source providing source electromagnetic radiation having a frequency outside the photonic bandgap, wherein the source directs the source electromagnetic radiation to the defect and the source electromagnetic radiation generates the desired electromagnetic radiation within the defect.

Preferred embodiments may have any of the following features. The defects include a series of defects arranged to form a waveguide within the photonic crystal and the desired electromagnetic radiation includes propagating electromagnetic radiation having a frequency within the photonic bandgap, wherein the waveguide supports the propagating electromagnetic radiation, the source directs the source electromagnetic radiation to the waveguide, and the source electromagnetic radiation generates the propagating electromagnetic radiation within the waveguide. The source electromagnetic radiation generates the propagating electromagnetic radiation through a non-linear interaction with material in the vicinity of the defects. The optical system also includes a device connected to the waveguide and responsive to the propagating electromagnetic radiation. At least one of the defects forms a cavity within the photonic crystal, wherein the cavity supports the desired electromagnetic radiation having a frequency within the photonic bandgap, the source directs the source electromagnetic radiation to the cavity, and the source electromagnetic radiation generates the desired electromagnetic radiation within the cavity. The source electromagnetic radiation generates the desired electromagnetic radiation through a non-linear interaction with material in the vicinity of the cavity. The electromagnetic energy from the desired electromagnetic radiation tunnels from the cavity to a surface of the photonic crystal and emerges as propagating electromagnetic radiation.

The invention has many advantages. For example, the invention obviates the need for separate waveguides to channel EM radiation from outside the photonic crystal into defect-based cavities and waveguides within the photonic crystal. These separate waveguides can be difficult to fabricate and can interfere with the properties of the photonic crystals.

Also, since the EM radiation incident on the photonic crystal has a frequency outside of the photonic bandgap (before the nonlinear generation of new frequencies), this radiation easily propagates into the crystal and can be incident on the crystal over a large area. In particular, it is unnecessary to focus the EM radiation into a beam with a small spotsize so that the beam efficiently couples to a separate waveguide that channels the radiation into the photonic crystal.

The method can be used to introduce into, or manipulate, signals in all-optical or opto-electronic integrated circuits or devices. For example, defect-based resonant cavities can be used as sources for light-emitting displays or micro-laser arrays. Moreover, the light emitted from these sources is generated by the non-linear interaction within the photonic crystal and thus can have frequencies that are difficult to generate in other types of light emitting displays.

Other features and advantages of the invention will be apparent from the following detailed description, and from the claims.

DETAILED DESCRIPTION

Figure 1:
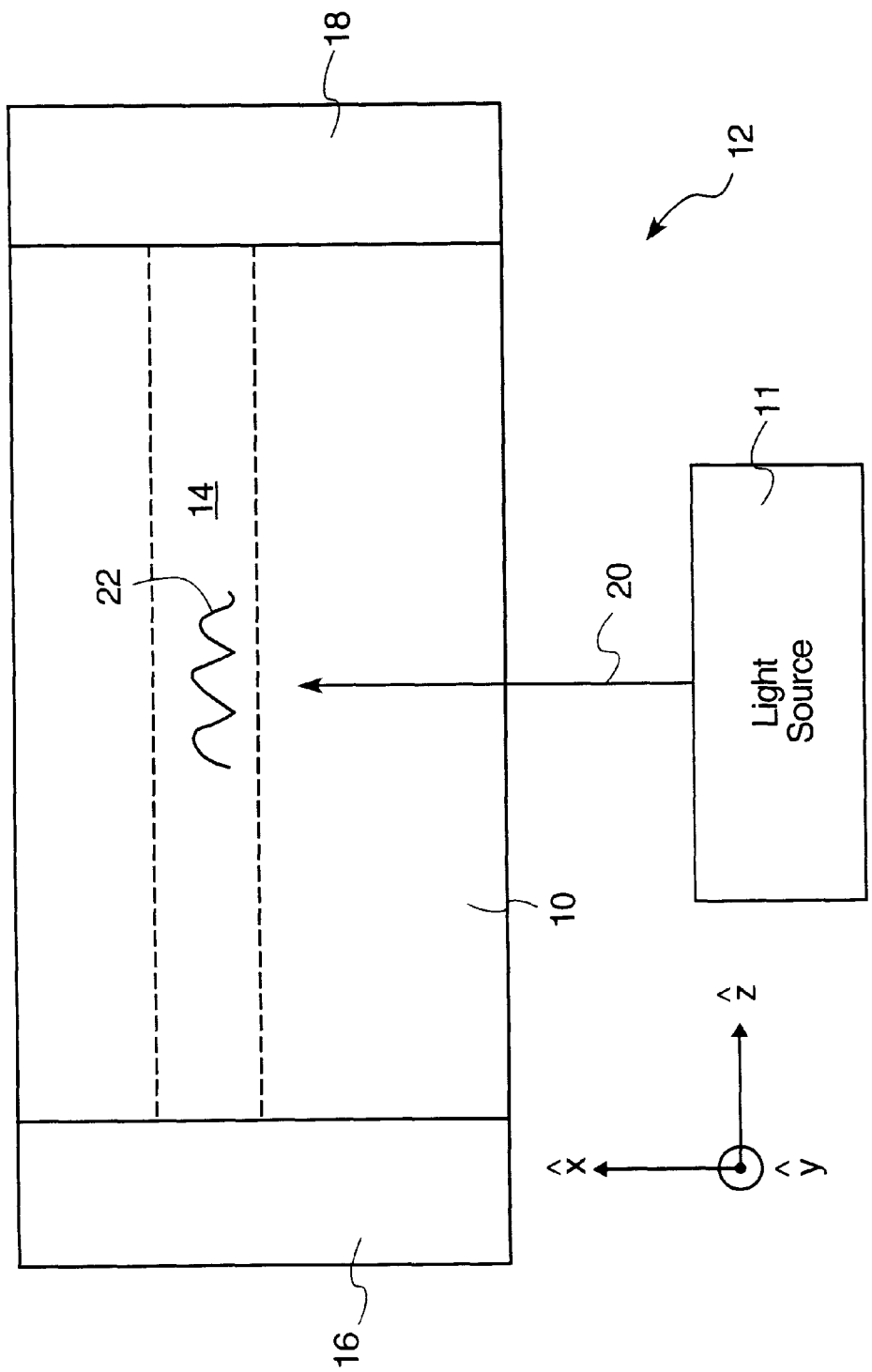
FIG. 1 is a plan view of an all-optical or optoelectronic integrated circuit in which a series of defects in a photonic crystal provides a waveguide.

Referring to FIG. 1, a photonic crystal 10 forms a portion of an all-optical or optoelectronic integrated circuit 12, which encloses an electromagnetic (EM) waveguide 14 that connects devices 16 and 18. The devices can be different from one another and can correspond to any other portion of the integrated circuit. For example, either of the devices can be an output coupler, an optical splitter, a power generator, a resonator, a filter, an all-optical gate, an electro-optic gate, a magneto-optical gate, a conductor, or a transistor. Photonic crystal 10 has a photonic bandgap and confines propagating EM radiation having a frequency within the photonic bandgap within waveguide 14. An EM source 11, such as a laser, illuminates the surface of photonic crystal 10 with EM source radiation 20 that has a frequency outside the photonic bandgap so that it propagates into the photonic crystal. In the vicinity of waveguide 14, a non-linear interaction between source radiation 20 and photonic crystal 10 produces desired EM radiation 22 having a frequency within the photonic bandgap. Thus, newly-generated EM radiation 22 is confined to waveguide 14 where it can propagate to devices 16 and 18.

Depending on the structure and function of the integrated circuit, newly-generated EM radiation 22 can be signals that are converted at devices 16 and 18 into other types of signals, such as electrical signals; they can be signals that control the operation of devices 16 and 18; they can be signals that carry information that is stored at devices 16 and 18; or they can be signals that are processed at devices 16 and 18 together with signals from other sources. In any of these cases, signals from other sources can also propagate between devices 16 and 18 along waveguide 14. Furthermore, although FIG. 1 illustrates waveguide 14 connecting two devices, in other embodiments one end of the waveguide can be completely sealed within the photonic crystal so that the waveguide only connects to a single device. Alternatively, the waveguide can connect to more than two devices.

For ease of reference, a Cartesian coordinate system is used to further describe photonic crystal 10. With reference to FIG. 1, the z-axis is in the direction of the waveguide, the x-axis is perpendicular to the z-axis and in the plane of the page, and the y-axis points out of the page.

Figure 2:
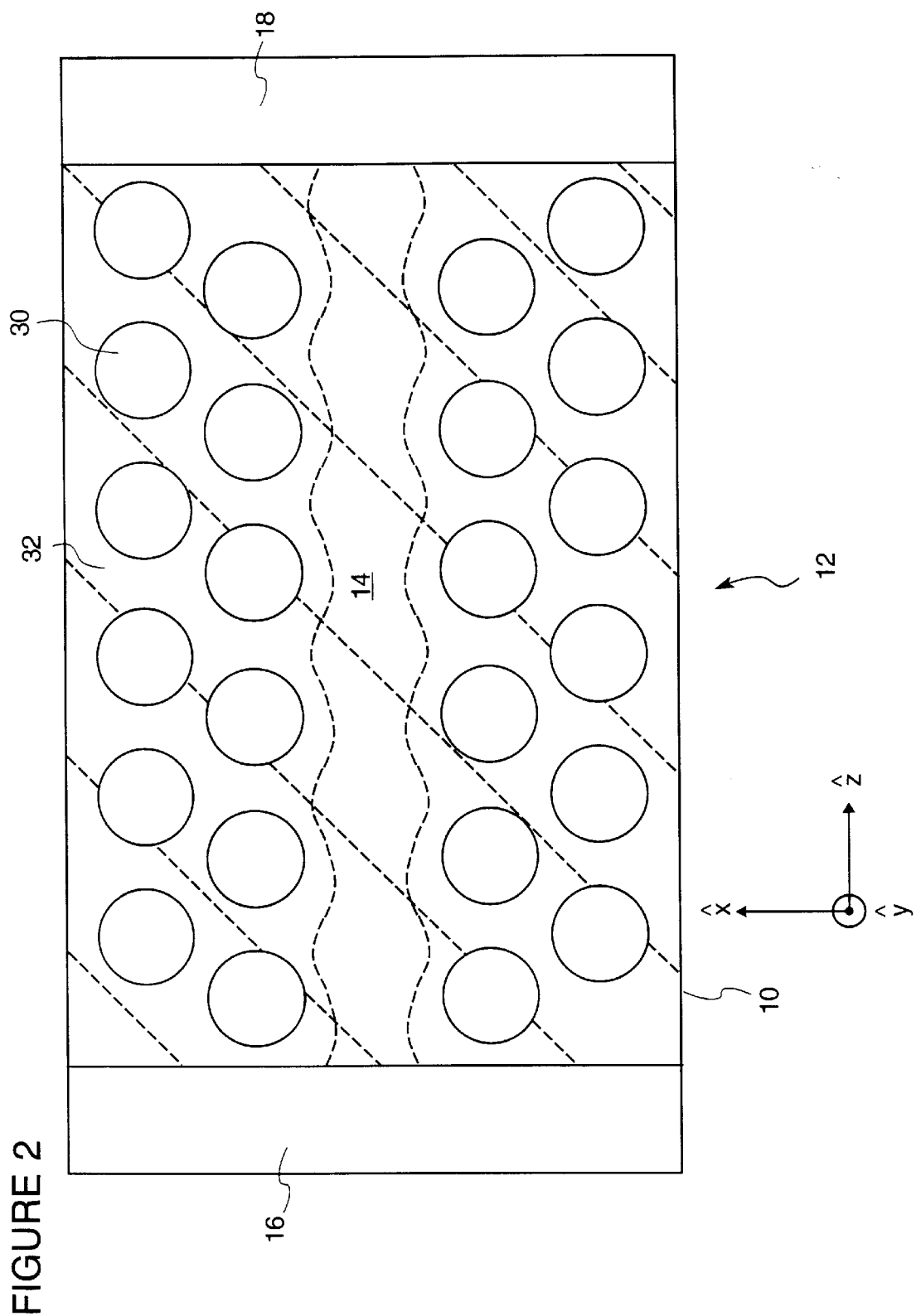
FIG. 2 is cross-sectional view of the photonic crystal in the integrated circuit shown in FIG. 1.

FIG. 2 shows a cross-sectional schematic of photonic crystal 10. In particular, FIG. 2 shows that photonic crystal 10 is formed from an evenly-spaced triangular array of rods 30 each having a first dielectric constant and a background material 32 surrounding the rods having a second dielectric constant, which is different than the first. Hence, photonic crystal 10 is a two-dimensional (2D) photonic crystal, having dielectric periodicity in the x-z plane. In this embodiment, background material 32 is a solid material and rods 30 are formed by air-filled voids in the solid material. In other embodiments, rods 30 can be made of another solid material, a liquid material, or vacuum. Alternatively, background material 32 can be made of liquid material, gas material, or vacuum, and rods 30 are made of solid material, e.g., the rods can be solid and the background material can be air.

A region of absent rods delineates a path connecting devices 16 and 18, thereby forming waveguide 14 (shown within dotted lines in FIG. 2). Background material 32 is present in place of the region of absent rods.

Alternatively, in other embodiments, the region of absent rods that forms waveguide 14 is made of a material having a third dielectric constant that is different from the first and second dielectric constants.

The properties of the photonic bandgap for photonic crystal 10 depend on the dielectric constant of background material 32, the dielectric constant of the material filling rods 30 (i.e., air), the radius of rods 30, and the spacing between rods. These factors can be selected to produce a photonic bandgap having desired characteristics, as described in J. D. Joannopoulos, ibid. For example, one can fabricate the crystal to have a photonic bandgap characterized by a particular central frequency and width. In the present embodiment, these factors are selected to produce a photonic bandgap centered in the mid- to far-infrared of the EM spectrum, e.g., centered on a frequency in the range of about 1 THz to 20 THz, which corresponds to wavelengths in the range of about 15 to 300 microns. In this case, the distances between the centers of the rods is about 50 microns and the diameter of the rods is in the range of about 10 to 20 microns.

The thickness of photonic crystal 10 along the y-axis can range from tens of Angstroms to hundreds of microns and even larger, and waveguide 14 can be surrounded on both sides with respect to the y-axis with additional material that mechanically seals the waveguide. Furthermore, if this additional material has a lower index of refraction than the index of the material in the waveguide, the EM radiation propagating substantially in the x-z plane will be confined within the waveguide with respect to the y-axis by complete internal reflection. Such a structure can be easily fabricated using etching and deposition techniques known in the art.

With respect to mid- to far-infrared (IR) EM radiation propagating along the x-z plane within photonic crystal 10, the EM radiation having a frequency within the photonic bandgap can only exist in, and remains confined to, waveguide 14, which can channel that EM radiation to devices 16 and 18. To generate the mid- to far-IR EM radiation (i.e., EM radiation 22 having a frequency within the photonic bandgap) within waveguide 14 in the present embodiment, source radiation 20 is a short pulse of visible light, and background material 32 is a non-centrosymmetric material. Suitable materials include ferroelectric materials such as lithium tantalate (LiTaO$_3$), lead titanate (PbTiO$_3$), potassium niobate (Knbo$_3$), barium titanate (BaTiO$_3$), potassium tantalate niobate (KTa$_{1-x}$Nb$_x$O$_3$), PZT (KZr$_x$Ti$_{1-x}$O$_3$), and PLZT (K$_{1-y}$Li$_y$Zr$_x$Ti$_{1-x}$O$_3$). Other non-centrosymmetric materials are also suitable including crystals in the KDP and KTP families and organic crystals such as DAST. Source radiation 20 interacts with background material 32 through a non-linear mechanism to produce EM radiation 22.

One suitable non-linear mechanism for producing EM radiation 22 is impulsive stimulated Raman scattering (ISRS), which can occur if background material 32 has Raman-active lattice modes. In ISRS, an ultrashort (e.g., typically less than 200 fs) excitation pulse exerts a sudden ("impulse") force on those Raman-active modes whose vibrational periods are longer than the pulse duration. This sudden driving force produces time-dependent vibrational oscillations. For a general reference on ISRS see, for example, Y. Yan and K. A. Nelson (*J. Chem Phys.,* 87:6240, 1987). In non-centrosymmetric materials such as background material 32, the excited Raman-active vibrational modes can also be polar. In such cases, the time-dependent vibrational oscillations correspond to coherent oscillating dipoles, which generate and couple to electromagnetic radiation. Thus, modes that are excited are coupled responses that are part electromagnetic field and part polar lattice vibration, modes known as phonon-polaritons. Phonon-polaritons occur in a relatively low wavevector regime where the EM frequency is comparable to the frequency of a polar lattice vibration. Because the polar vibration couples to EM radiation, the lattice vibration is dispersive in this wavevector regime and produces propagating responses.

Figure 3:
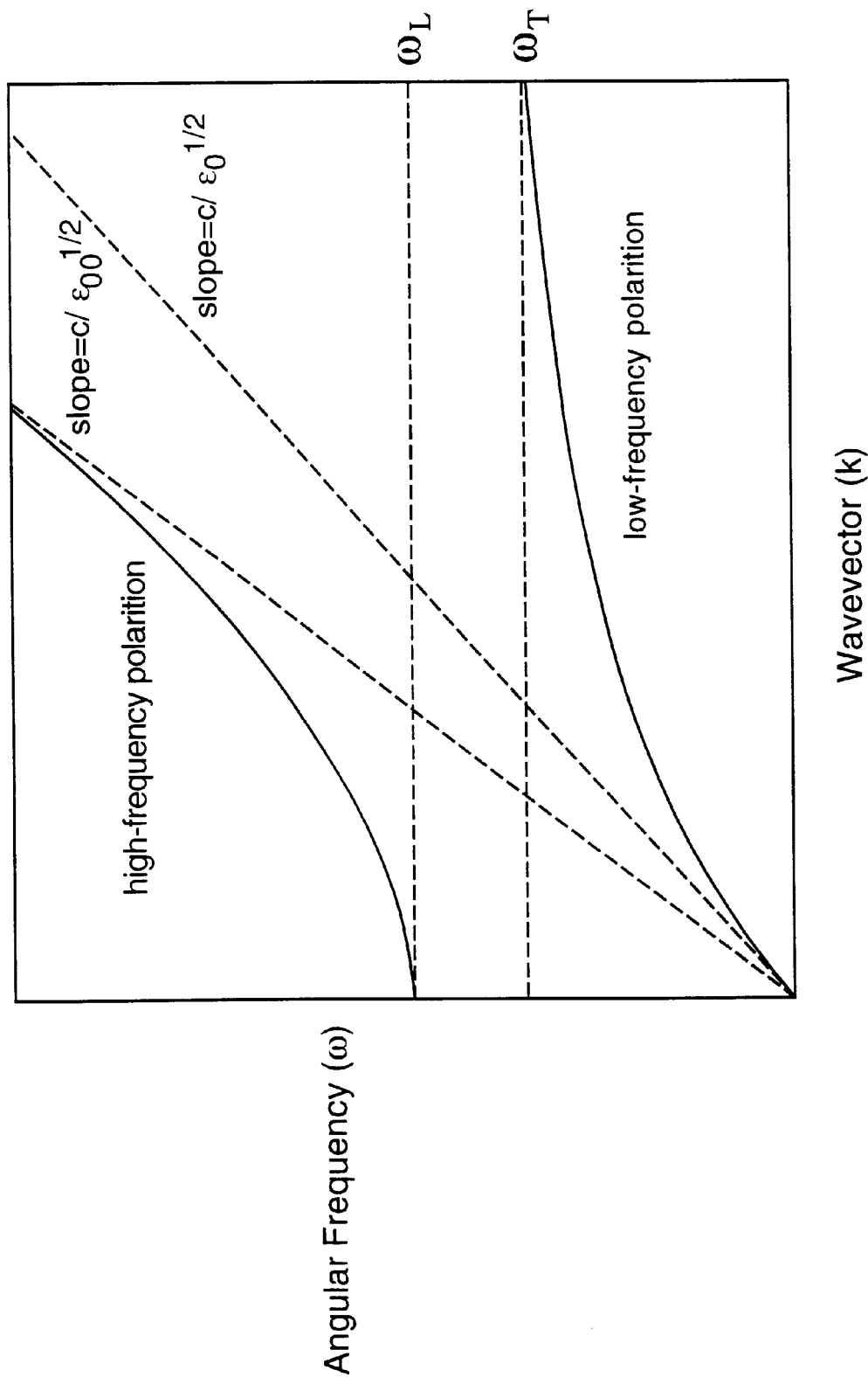
FIG. 3 is a plot of dispersion curves for a phonon-polariton in a bulk material.

FIG. 3 shows a typical dispersion curve for the frequency of a transverse polar lattice vibration in the polariton region in a bulk material. The frequency of the lower branch approaches the transverse optic phonon frequency $\omega_T$ at large wavevector k, while the frequency of the higher branch approaches the longitudinal optic phonon frequency $\omega_L$ at small wavevector k. For a general reference on ISRS excitation of phonon-polaritons see, for example, T. P. Dougherty et al. (*J. Opt. Soc. Am. B.,* 9:2179, 1992).

Figure 4:
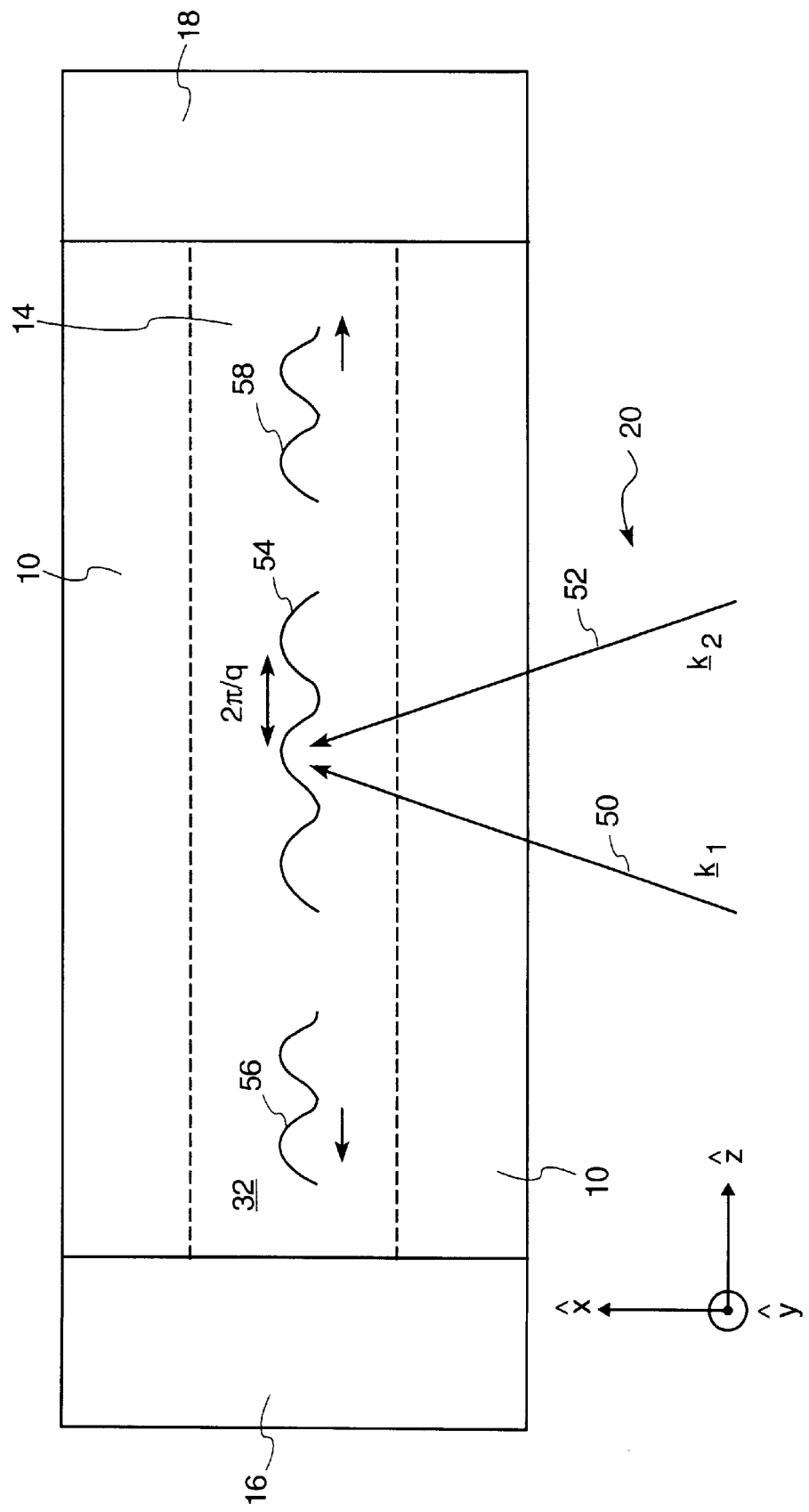
FIG. 4 is a schematic of grating excitation of phonon-polaritons in the integrated circuit shown in FIG. 1.

To excite the polar, Raman-active lattice mode (i.e., a phonon-polariton) in background material 32, source radiation 20 must provide an impulsive force having a spatial profile that includes the wavevector corresponding to the frequency of the polar, Raman-active lattice mode. As shown in FIG. 4, source radiation 20 having such characteristic can be produced by a pair of crossed excitation beams 50 and 52 having wavevectors $k_1$ and $k_2$, respectively. The beams can be, for example, 800 nm sub-100 fs pulses from a titanium sapphire laser. Within background material 32, beams 50 and 52 interfere with one another to form a sinusoidal intensity profile 54 (i.e., a grating) having a period equal to 2 $\pi$/q, where q equals the absolute value of $k_1-k_2$. Within each of the peaks of sinusoidal intensity profile 54, source radiation imparts an impulsive driving force on the Raman active modes within background material 32 in the vicinity of waveguide 14. The overall driving force thus corresponds to a driving force having central wavevectors $\pm(k_1-k_2)$. The crossing angle between the two beams, which specifies $\pm(k_1-k_2)$, is chosen such that the phonon-polaritons excited at these wavevector have a corresponding frequency that is within the bandgap of photonic crystal 10. Since the spotsizes of beams 50 and 52 are finite, a range of wavevectors is generated and polariton dispersion produces two counter-propagating polariton wavepackets 56 and 58 after exciting the crystal with source radiation 20.

If the sample being excited were not a photonic crystal, source radiation 20 would excite phonon-polaritons throughout the sample. However, because of the photonic bandgap in photonic crystal 10, source radiation 20 only excites phonon-polaritons having a frequency within the photonic bandgap in the defect regions of photonic crystal 10, i.e., within or in proximity to waveguide 14. Although source radiation 20 may initially drive lattice displacements in regions away from waveguide 14, the electromagnetic fields generated from those initial lattice displacements that have frequencies within the bandgap will immediately counteract such displacements. This destructive interference is a consequence of the periodicity in the photonic crystal. Thus, source radiation 20 produces propagating phonon-polaritons having a frequency within the photonic bandgap only within or in proximity to waveguide 14.

In the present embodiment, in which background material 32 forms waveguide 14, the confined EM radiation 22 is the electromagnetic component of the phonon-polaritons excited by source radiation 20. Indeed, within materials such as background material 32, EM radiation 22 exists as only one component of a phonon-polariton because of the coupling between EM fields and polar lattice modes for frequencies within the polariton region. Nonetheless, EM radiation 22 remains confined within waveguide 14 since a phonon-polariton having a frequency within the photonic bandgap cannot exist within non-defect regions of photonic crystal 10. Once excited by source radiation 20, the phonon-polaritons propagate within waveguide 14. Initially, the phonon-polaritons propagate according to the wavevector content of the intensity of profile of source radiation 20, which generated the phonon-polaritons. Subsequently, the phonon-polaritons can undergo internal reflections within the waveguide. In one example, as shown in FIG. 4, wavepackets 56 and 58 generated by the grating excitation produced with beams 50 and 52 propagate toward devices 16 and 18, respectively.

Although we have described ISRS excitation of phonon-polaritons using grating excitation, single beam excitation can also generate phonon-polaritons within or in proximity to waveguide 14. For example, a tightly-focused, ultrashort excitation pulse can also generate phonon-polaritons through ISRS. As in the approach using grating excitation, difference frequency mixing among the frequency components of the large bandwidth (i.e., ultrashort) pulse drives the phonon-polariton. However, in this case, the difference frequency components correspond to difference wavevectors existing within the tightly-focussed pulse rather than from two crossed beams. As a result, exciting the crystal with a single pulse generates relatively low wavevector phonon-polaritons, with the range of wavevectors inversely proportional to the spot size of the excitation pulse.

Another non-linear mechanism that can produce confined EM radiation 22 is the electro-optic effect, which can occur in response to an ultrashort visible pulse similar to that used in the ISRS mechanism. In the electro-optic effect, a non-linear material in either the rods 30 or background material 32 rectifies the ultrashort visible excitation pulse to produce a short burst of terahertz radiation that has a central frequency within the photonic bandgap of photonic crystal 10. Those parts of the terahertz radiation that have frequencies within the photonic bandgap form confined EM radiation 22. For a reference on the electro-optic mechanism, see, for example, D. H. Auston and M. C. Nuss (*IEEE J. Quan. Elec.,* 24:184, 1988).

If the waveguide in the photonic crystal does not have polar lattice modes, confined EM radiation 22 simply propagates within waveguide 14 as terahertz radiation. If the waveguide in the photonic crystal does have polar lattice modes, confined EM radiation 22 can couple to these lattice modes and exists as the electromagnetic component of a phonon-polariton.

For the electro-optic effect, source EM radiation 22 can include single or multiple beams. As described previously, if a single tightly-focussed excitation pulse is used as the source EM radiation, only relatively low wavevector phonon-polaritons are generated, with a range inversely proportional to the spot size of the excitation pulse.

In alternative embodiments of a photonic crystal, the materials that form the rods 30 and the background material 32 are reversed. For example, the photonic crystal can be formed from a hexagonal array of evenly-spaced rods made of the ferroelectric materials described previously with the spaces between the rods filled with air or vacuum. The patterned absence of rods (e.g., a series of defects or voids) can form a waveguide that connects devices, as in FIG. 2. For such types of photonic crystals, source radiation 20 can produce EM radiation 22 within the waveguide through the ISRS mechanism by exciting phonon-polaritons in the rods adjacent the waveguide. While the lattice displacement is confined to the rods, the EM field component of the phonon-polaritons can propagate into the waveguide thereby forming EM radiation 22. Similarly, with respect to the electro-optic effect, the rods rectify the ultrashort visible source radiation to generate the burst of terahertz radiation, which can propagate into waveguide 14 as a purely EM mode (i.e., rather than a polariton) to form EM radiation 22.

The intensity of EM radiation 22 generated within waveguide 14 depends on the intensity of source radiation 20 and the properties of the material in which non-linear generation is taking place. For some non-linear mechanisms the polarizations of the one or more beams that form source radiation 20 also affects the intensity of the non-linearly generated EM radiation 22. For the ISRS and electro-optic mechanisms described above, a suitable intensity for source radiation 20 is about $5 \times 10^{10}$ W/cm$^2$ (e.g., 10 nanojoules in a 200 fs pulse focussed to about a 10 micron spotsize). Excitation intensities much less than $5 \times 10^{10}$ W/cm$^2$, e.g., $5 \times 10^8$ W/cm$^2$ and $5 \times 10^6$ W/cm$^2$, are also possible and depend on the desired intensity of the confined EM radiation being generated and on the mechanisms used to ultimately detect or interact with the generated EM radiation. For example, very weak EM signals can be detected by various methods such as photon counting, optical heterodyne techniques, and electro-optic sampling. Also, the ferroelectric materials described above (i.e., LiTaO$_3$, PbTiO$_3$, Knbo$_3$, BaTiO$_3$, Kta$_{1-x}$Nb$_x$O$_3$, PZT, and PLZT) have relatively large susceptibilities for ISRS and the electro-optic effect. Of course, as is well known in the art there are many other non-linear mechanisms and materials, all of which may be employed in the invention.

For example, other non-linear mechanisms such as harmonic generation can also be used to produce the desired EM radiation within waveguide 14. In this case, rather than using visible radiation to produce far- or mid-IR frequency, the non-linear interaction produces radiation having a frequency greater than the frequency of the source radiation. The critical feature is that the source radiation can propagate freely within the photonic crystal (i.e., it has a frequency above or below the photonic bandgap) and the non-linearly generated radiation has a frequency within the photonic bandgap, and is thus confined to defects within the photonic crystal. As described above, the frequencies of the photonic bandgap scale inversely with the periodicity of the photonic crystal, thus for the case of harmonic generation using visible or near-IR light as the source radiation, the periodic spacing of the photonic crystal is much smaller than the 50 microns described previously, e.g., less than about 1 micron. For a general reference on non-linear mechanisms, see for example, Y. R. Shen (*The Principles of Non-Linear Optics*, New York: J. W. Wiley Interscience, 1984). In many embodiments, the peak intensity of the source radiation is typically greater than $1 \times 10^6$ W/cm$^2$, or more typically greater than $1 \times 10^8$ W/cm$^2$. Also, in many embodiments, the source radiation is coherent and has a bandwidth that is greater than 10 Ghz, or in some cases greater than 1 THz. In other embodiments, the source radiation is coherent and has a narrow bandwidth, e.g., less than 500 Mhz, or in some cases less than 100 Mhz.

Figure 5:
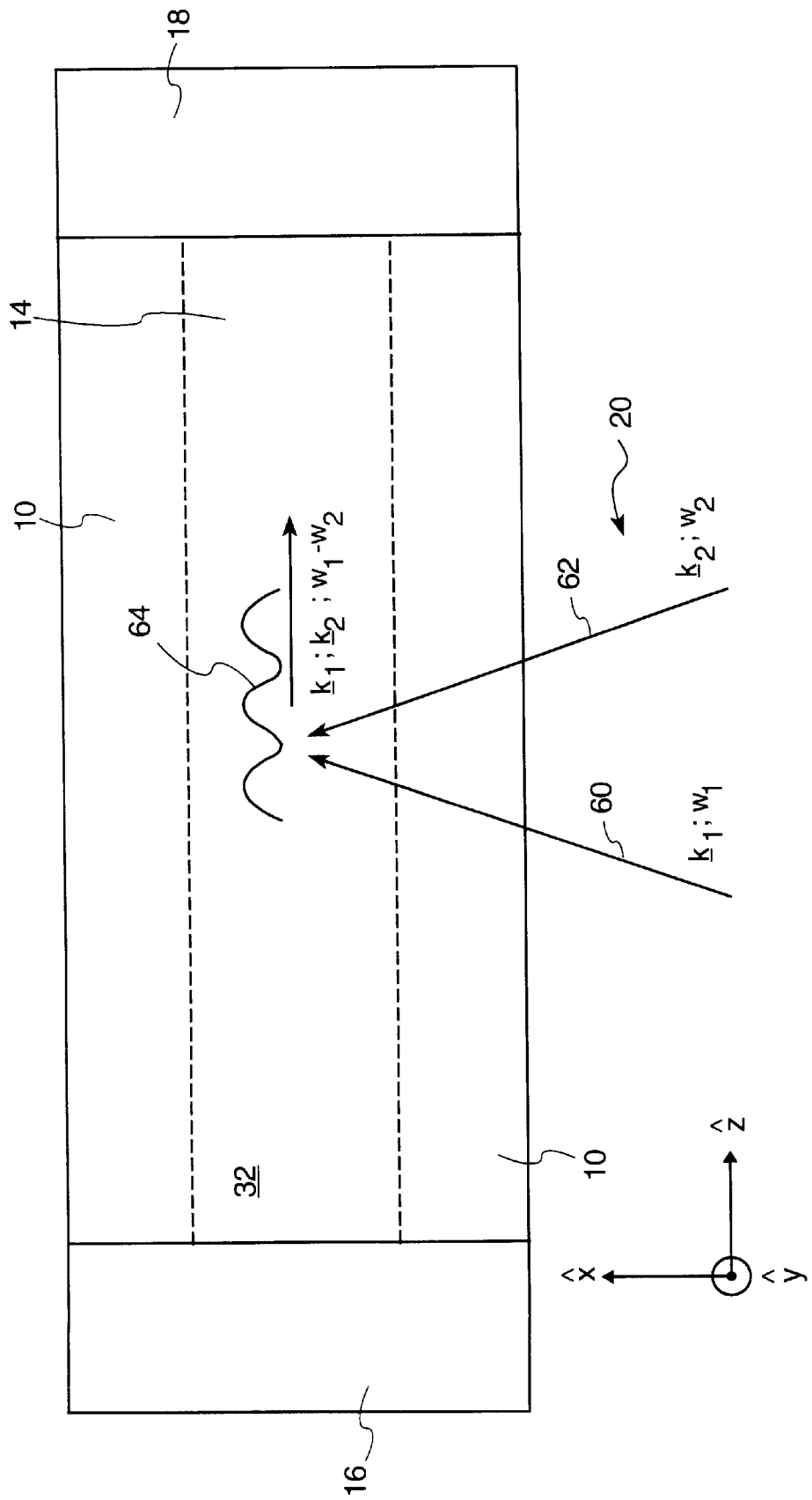
FIG. 5 is a schematic of difference frequency mixing generation of EM radiation confined to the waveguide of the integrated circuit shown in FIG. 1.

Depending on the non-linear mechanism, source radiation 20 can include continuous-wave radiation instead of, or in addition to, pulsed radiation. Also, the source radiation can include one or more beams having the same or different frequencies, frequency profiles, temporal profiles, or spatial profiles. For example, FIG. 5 shows excitation of confined EM radiation using difference frequency mixing. A pair of crossed, visible continuous-wave beams 60 and 62 form source EM radiation 20. Beam 60 has wavevector $k_1$ and frequency $\omega_1$ and beam 62 has wavevector $k_2$ and frequency $\omega_2$, which has a lower frequency than $\omega_1$. The difference between the frequencies, $\omega_1 - \omega_2$, is equal to a frequency, e.g., an IR frequency, within the bandgap of photonic crystal 10. Beams 60 and 62 interact with background material 32 through a difference frequency mixing mechanism to generate EM radiation 64, which has a frequency of $\omega_1 - \omega_2$ and a wavevector of $k_1 - k_2$. The photonic crystal confines EM radiation 64 to waveguide 14 since the frequency of EM radiation 64, $\omega_1 - \omega_2$, is within the photonic bandgap.

The embodiments described above and in reference to FIG. 2 have involved a 2D photonic crystal. It is also possible to form waveguide 14 by introducing defects into a 3D photonic crystal. Structures and methods for making 3D photonic crystals are described in U.S. Pat. No. 5,600,483, the contents of which are incorporated herein by reference, and in J. D. Joannopolous, ibid. The methods described above for introducing EM radiation having a frequency within the photonic bandgap into defects of a 2D photonic crystal work equally well for a 1D or 3D photonic crystals.

In all embodiments, the source radiation has a frequency outside the photonic bandgap of the photonic crystal. Nonetheless, it is possible that the varying indices of refraction in the photonic crystal can scatter the source radiation. For example, source radiation 20 may partially reflect from the solid-air interface between rods 30 and background material 32 for the photonic crystal shown in FIG. 2. To minimize the scatter of the source radiation, voids in a photonic crystal can be filled with index matching fluids. As is well known in the art, index matching fluids can produce a smoothly varying index of refraction across an interface for a certain range of wavelengths. As a result, the presence of the index matching fluid will minimize the scatter of the source radiation. Of course, the index matching fluid must be chosen such that it does not interfere with the generation of the photonic bandgap in the photonic crystal. This condition is easily satisfied for visible source radiation generating mid- to far-IR radiation (e.g., through ISRS or the electro-optic effect), since the index-matching properties of the index matching fluids will be limited to visible EM radiation and will have no affect on mid- to far-IR EM radiation.

Figure 6:
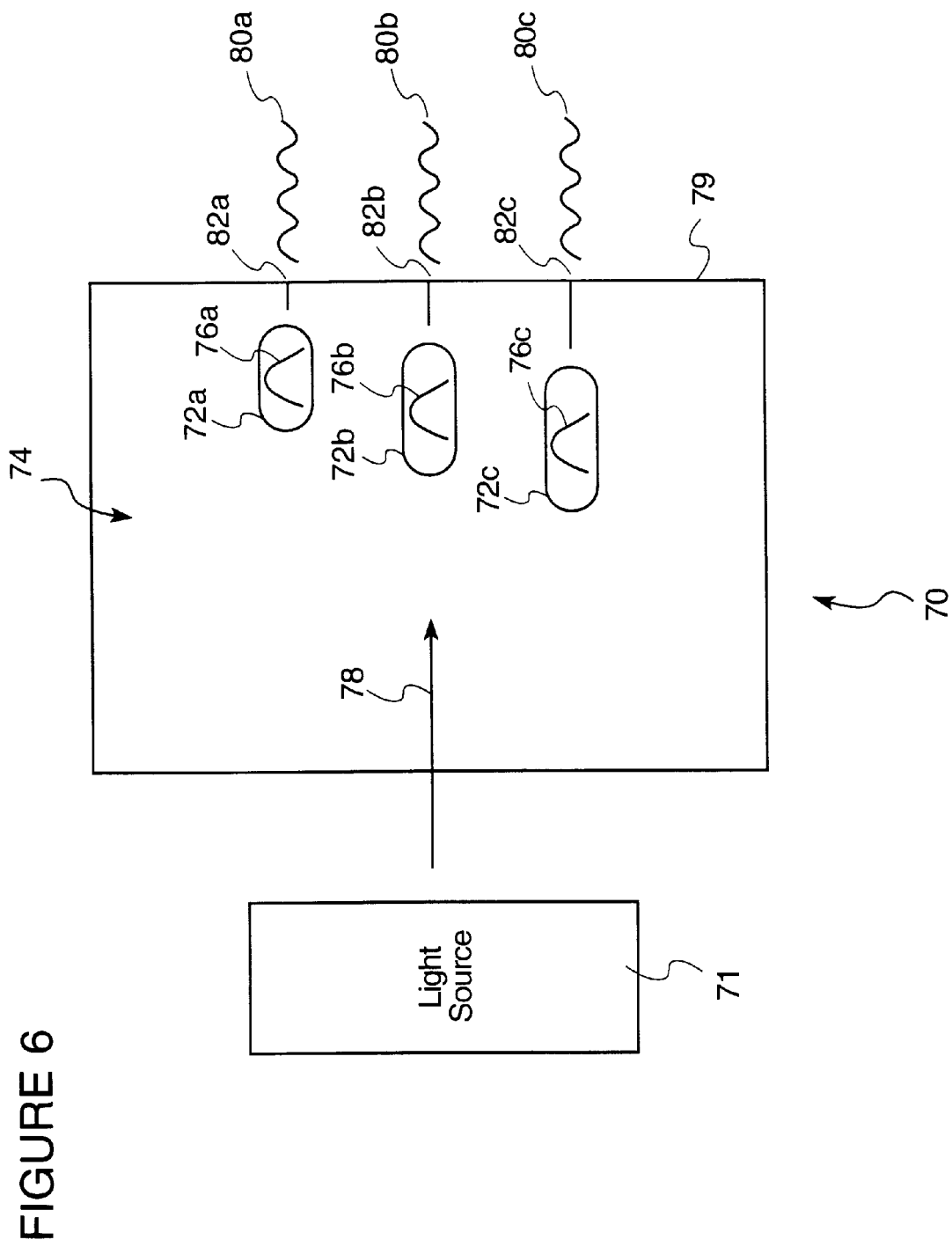
FIG. 6 is a schematic of a light emitting display using defects in a photonic crystal as cavity sources.

In the embodiments described above, a series of defects in a photonic crystal formed a waveguide in an optoelectronic circuit. In other applications, defects in the photonic crystal form separated cavities that can support localized EM modes having a frequency within the photonic bandgap of the photonic crystal. Rather than use separate waveguides to introduce this EM radiation into the cavities, source radiation having a frequency outside the photonic bandgap can generate it through a non-linear interaction with the material forming the photonic crystal. Such a system, which can form a light emitting display 70, is shown in FIG. 6.

Display 70 includes a 3-D photonic crystal 74 having a series of isolated cavities 72 (72a, 72b, and 72c) formed from defects in the photonic crystal. Each of the defects supports an isolated EM mode 76 (76a, 76b, and 76c) having a frequency within the photonic bandgap of the photonic crystal. A source 71 illuminates photonic crystal 74 with source radiation 78 having a frequency outside the photonic bandgap. The source radiation then generates EM modes 76 in each of the cavities 72 through a non-linear interaction with the material forming the photonic crystal. The non-linear interaction can, for example, be one of those described previously, e.g., ISRS, electro-optic effect, harmonic generation. As in the optoelectronic circuit 12, source radiation 78 can propagate through the photonic crystal but the non-linearly generated radiation (EM modes 76) remain confined within cavities 72. As described previously with regard to waveguide 14, the non-linear interaction takes place within or in proximity to cavities 72, which can be formed from voids or a material different than that corresponding to the periodic arrangement of the photonic crystal (i.e., cavities 72 are defects).

As source 71 illuminates photonic crystal 74, the energy in EM modes 76 increases. However, because the extent of the photonic crystal 74 is not infinite, the EM energy in EM modes 76 can tunnel as an evanescent wave from cavities 72 to regions outside photonic crystal 74. Thus, propagating EM radiation 80 (80a, 80b, and 80c) having a frequency within the photonic bandgap will emerge from a surface 79 of photonic crystal 74 at locations 82 (82a, 82b, and 82c) closest to the respective cavities 72. The tunnelling probability (and thus the rate of emerging radiation) for a particular cavity decreases exponentially with the distance from that particular cavity to the surface of the photonic crystal and increases with respect to the EM energy in that particular cavity. Thus, assuming that source radiation 78 produces the same EM energy in cavities 72a and 72b, the light emerging from location 82a will be brighter than the light emerging from 82b.

For continuous illumination or quasi-continuous illumination (e.g., repetitive excitation with a pulsed source) by source radiation 78, the EM energies confined within each of cavities 72 reach steady state values, and similarly, the rates of EM radiation 80 emerging from each of cavities 72 also reach steady state values. If source radiation 78 is terminated, EM radiation 80 emerging from display 70 will gradually decay. The particular steady state and decay rate values will depend on the respective distances from cavities 72 to locations 82, the energy flux of source radiation 78, and other factors involving the properties of the respective cavities such as the size and shape of the cavity and the complex index of refraction of the material surrounding the cavity. Thus, a user can optimize the steady state and decay rate values for the particular application of the display through an appropriate construction of the photonic crystal 74 and an appropriate choice of source radiation 78. In particular, by controlling the temporal and spatial profile of source radiation 78 to generate EM energy in selected cavities 72 at selected times, a user can control the intensity and timing of the EM radiation 80 emerging from display 70.

Also, EM radiation 80 emerging from display 70 will be relatively monochromatic, corresponding only to those frequencies within the photonic bandgap that are supported by the cavity. Moreover, these frequencies will be different from the frequencies of source radiation 78, and thus display 70 can emit EM radiation having frequencies that may be otherwise difficult to achieve using other sources. Furthermore, the spot size of EM radiation 80 emerging from display 70 can be made relatively small. In particular, the spot size will correspond approximately to the cross-sectional area of the respective cavities 72. This is because the tunnelling probability decreases exponentially with distance and so the evanescent waves from which EM radiation 80 emerges will travel along the shortest path to the surface of the display. The display could be used as a pump source for a micro-laser array.

Other embodiments are also possible. For example, in the embodiment shown in FIG. 6, source 71 illuminates the photonic crystal from one side and EM radiation 80 emerges from the opposite side. In alternative embodiments, the cavities in the photonic crystal can be constructed so that EM radiation 80 emerges from a different side of the photonic crystal. In particular, EM radiation 80 emerges from the side or sides of the photonic crystals closest to each of the respective cavities. Also, although we have shown source 11 and source 71 as separate from integrated circuit 12 and display 70, respectively, in other embodiments these sources can be integral with these devices. Furthermore, although we have shown waveguide 14 as being substantially straight, in other embodiments it can include sharp turns. In particular, since the waveguide is based on a series of defects within a photonic crystal, the waveguide can include turns that are sharper than turns in conventional waveguides based on total internal reflection, see Meade et al., ibid.

Figure 7:
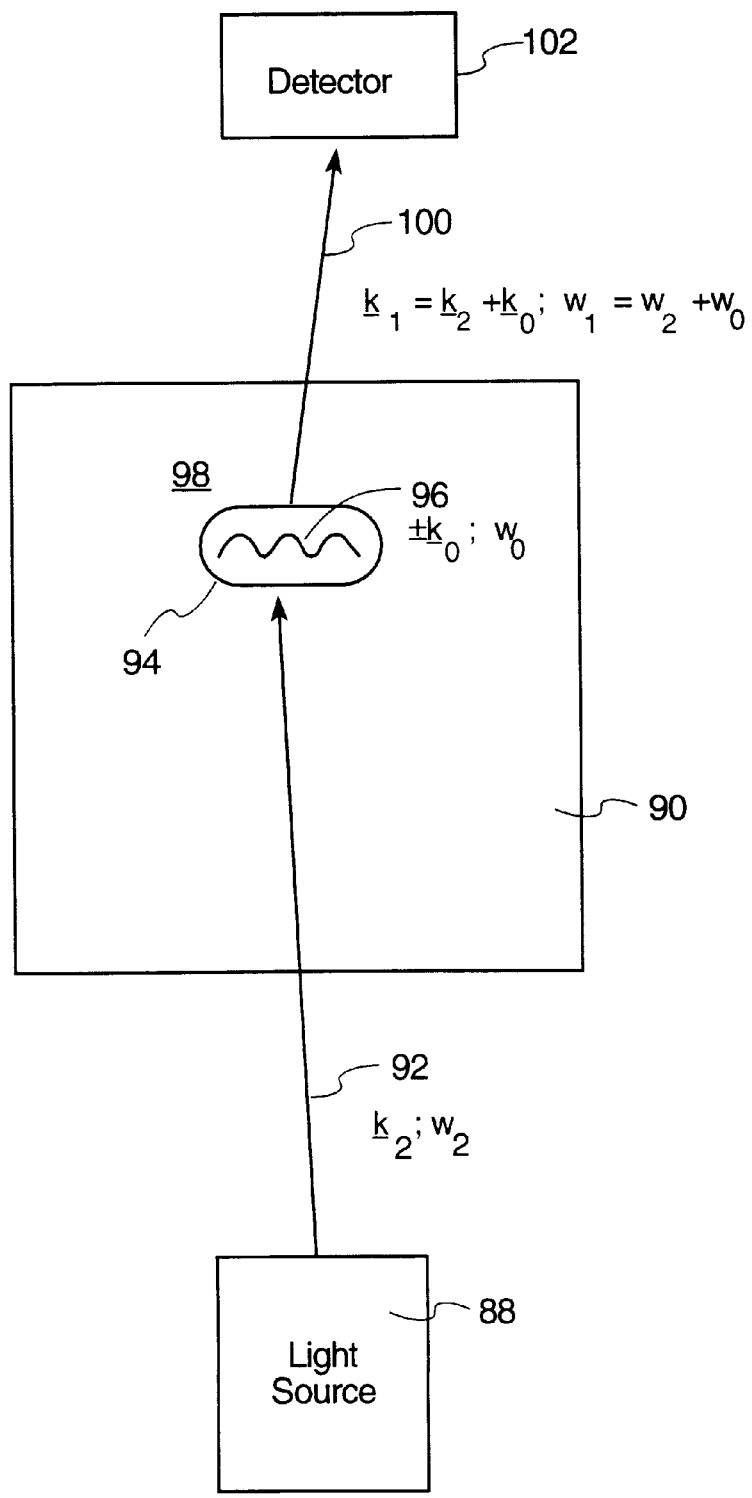
FIG. 7 is a schematic of up-conversion sum frequency mixing detection of EM radiation confined to a defect of a photonic crystal.

In a related aspect of the invention, any of the non-linear mechanisms used to generate EM radiation confined to a defect within a photonic crystal can also be used to detect EM radiation confined to a defect in a photonic crystal. Referring to FIG. 7, light source 88 produces probe EM radiation 92 having a frequency outside the photonic bandgap of a photonic crystal 90 and directs probe EM radiation 92 towards a defect 94 in photonic crystal 90. If there is EM radiation 96 that has a frequency within the photonic bandgap of photonic crystal 90 and is confined to defect 94, probe EM radiation 92 interacts with confined EM radiation 96 and material 98 in photonic crystal 90 in the vicinity of defect 94 through a non-linear mechanism to generate signal EM radiation 100, which has a frequency outside the photonic bandgap of photonic crystal 90. A detector 102 is positioned to receive signal EM radiation 100 emerging from photonic crystal 90, the presence of which is indicative of confined EM radiation 96 at defect 94.

In the specific embodiment shown in FIG. 7, the non-linear mechanism that is employed is up-conversion or sum frequency generation. Probe EM radiation 92 is a visible beam having a frequency $\omega_2$ and a wavevector $k_2$. Confined EM radiation 96 is in the infrared with a frequency of $\omega_0$ and is confined as a standing wave within defect 94, which forms a cavity. The standing wave includes wavevectors $+k_0$ and $-k_0$. The non-linear interaction between probe EM radiation 92, confined EM radiation 96, and material 98 generates signal EM radiation 100, which emerges as an up-converted visible beam having frequency $\omega_1 = \omega_2 + \omega_0$ and wavevector $k_1=k_2+k_0$. The up-converted visible beam is detected by detector 102 indicating the presence of the confined EM radiation. The non-linear interaction that detects confined EM radiation 96 in FIG. 7 is the inverse of the non-linear interaction that generates confined EM radiation 64 in FIG. 5.

One can modify any of the above embodiments to include different non-linear interactions and variations in the probe, signal, and confined EM radiations. In particular, the different types of source EM radiations described above as being suitable for the generation of the confined EM radiation are also suitable as different types of probe EM radiation for the detection of the confined EM radiation. Also, depending on the non-linear interaction, the signal EM radiation can have a frequency, polarization, propagation direction, or frequency, temporal, or spatial amplitude and/or phase profile that is different from those of the probe EM radiation, which enables one to distinguish detection of the signal EM radiation from detection of the probe EM radiation. Also, the probe and signal EM radiation can overlap with one another and form a heterodyne signal component, which can be detected. For example, the probe and signal EM radiation can form a heterodyne signal through the heterodyned optical Kerr effect. Furthermore, the defect in other embodiments can be part of one or more defects that form one or more waveguides, one or more cavities, or both, and the confined EM radiation can have a frequency that is not in the infrared and can be a propagating wave rather than a standing wave.

Depending on the specific non-linear interaction for the generation or detection of EM radiation confined at a defect in a photonic crystal, there will be optimum arrangements for the directions and polarizations for the source (or probe) EM radiation and optimum orientations for the photonic crystal, which together may satisfy phase-matching conditions that increase the macroscopic efficiency of the non-linear interaction. For more information, see, for example, Y. R. Shen, ibid.

Other aspects, advantages, and modifications are within the scope of the following claims.

What is claimed is:

1. A method for inducing electromagnetic radiation in a photonic crystal having a periodic variation in dielectric constant sufficient to produce a photonic bandgap for at least one propagation direction and at least one polarization direction, the photonic bandgap defining a frequency range for which electromagnetic radiation at a frequency within the frequency range and having a polarization direction among the at least one polarization direction cannot propagate along the at least one propagation direction, and the photonic crystal having at least one defect in the periodic variation sufficient to support a localized mode of electromagnetic radiation at a frequency within the frequency range of the photonic bandgap, the method comprising the steps of:

delivering electromagnetic radiation having a frequency outside the frequency range of the photonic bandgap to the defect; and generating electromagnetic radiation having a frequency within the frequency range of the photonic bandgap at the defect in response to the delivered electromagnetic radiation.

2. The method of claim 1, wherein the electromagnetic radiation having a frequency within the frequency range of the photonic bandgap is generated through a non-linear interaction between material in the vicinity of the defect and the delivered electromagnetic radiation.

3. The method of claim 1, wherein the delivered electromagnetic radiation is from a coherent source.

4. The method claim 3, wherein the delivered electromagnetic radiation has a bandwidth greater than the frequency of the generated electromagnetic radiation.

5. The method of claim 3, wherein the delivered electromagnetic radiation has a bandwidth greater than 1 THz.

6. The method of claim 2, wherein the non-linear interaction is selected from the group consisting of harmonic generation, sum frequency mixing, difference frequency mixing, optical rectification, electro-optic effect, stimulated Raman scattering, and impulsive stimulated Raman scattering.

7. The method of claim 1, wherein the delivered electromagnetic radiation has a peak intensity greater than $1\times10^6$ W/cm$^2$.

8. The method of claim 1, wherein the delivered electromagnetic radiation has a peak intensity greater than $1\times10^8$ W/cm$^2$.

9. The method of claim 1, wherein the delivered electromagnetic radiation has a peak intensity greater than $1\times10^{10}$ W/cm$^2$.

10. The method of claim 1, wherein the photonic crystal comprises a ferroelectric material.

11. The method of claim 10, wherein the ferroelectric material is selected from the group consisting of PbTiO$_3$, KNbO$_3$, LiTaO$_3$, BaTiO$_3$, KTN, PZT, and PLZT.

12. The method of claim 1, wherein the defect is a void.

13. The method of claim 12, further comprising filling the void with index-matching fluid for the source electromagnetic radiation to prevent scattering of the source electromagnetic radiation.

14. The method of claim 1, wherein the frequency of the delivered electromagnetic radiation is within the visible and near-infrared region of the electromagnetic spectrum and the frequency of the generated electromagnetic radiation is in the near-infrared and infrared region of the electromagnetic spectrum.

15. The method of claim 1, wherein the at least one defect comprises a series of defects arranged to form a waveguide.

16. The method of claim 1, wherein the at least one defect forms a cavity.

17. An optical system comprising:

a photonic crystal having a periodic variation in dielectric constant sufficient to produce a photonic bandgap for at least one propagation direction and at least one polarization direction, the photonic bandgap defining a frequency range for which electromagnetic radiation at a frequency within the frequency range and having a polarization direction among the at least one polarization direction cannot propagate along the at least one propagation direction, and the photonic crystal having at least one defect in the periodic variation sufficient to support a localized mode of electromagnetic radiation at a frequency within the frequency range of the photonic bandgap; and a source which during operation delivers electromagnetic radiation having a frequency outside the frequency range of the photonic bandgap to the defect, the delivered radiation generating electromagnetic radiation having a frequency within the frequency range of the photonic bandgap at the defect.

18. The system of claim 17, wherein the at least one defect comprises a series of defects arranged to form a waveguide within the photonic crystal, wherein during operation the generated electromagnetic radiation propagates along the waveguide.

19. The system of claim 18, wherein the delivered electromagnetic radiation generates the electromagnetic radiation having a frequency within the frequency range of the photonic bandgap through a non-linear interaction with material in the vicinity of the defects.

20. The system of claim 18, further comprising a device connected to the waveguide and responsive to the generated electromagnetic radiation propagating along the waveguide.

21. The system of claim 17, wherein the at least one defect forms a cavity within the photonic crystal.

22. The system of claim 21, wherein the delivered electromagnetic radiation generates the electromagnetic radiation having a frequency within the frequency range of the photonic bandgap through a non-linear interaction with material in the vicinity of the cavity.

23. The system of claim 21, wherein electromagnetic energy from the generated electromagnetic radiation tunnels from the cavity to a surface of the photonic crystal and emerges as propagating electromagnetic radiation.

24. A method for detecting electromagnetic radiation confined in a photonic crystal, the photonic crystal having a periodic variation in dielectric constant sufficient to produce a photonic bandgap for at least one propagation direction and at least one polarization direction, the photonic bandgap defining a frequency range for which electromagnetic radiation at a frequency within the frequency range and having a polarization direction among the at least one polarization direction cannot propagate along the at least one propagation direction, and the confined radiation having a frequency within the frequency range of the photonic bandgap and being confined to at least one defect in the periodic variation, the method comprising the steps of:

directing probe electromagnetic radiation having a frequency outside the frequency range of the photonic bandgap toward the defect;

generating signal electromagnetic radiation that has a frequency outside the frequency range of the photonic bandgap through an interaction between the probe electromagnetic radiation, the confined electromagnetic radiation, and material in the vicinity of the defect; and detecting the signal electromagnetic radiation to indicate the presence of the confined electromagnetic radiation.

25. The method of claim 24, wherein the interaction is a non-linear interaction.

26. The method of claim 25, wherein the non-linear interaction is selected from the group consisting of harmonic generation, sum frequency mixing, difference frequency mixing, optical rectification, electro-optic effect, stimulated Raman scattering, impulsive stimulated Raman scattering, and optical Kerr effect.

27. The method of claim 24, wherein the probe electromagnetic radiation has a peak intensity greater than $1 \times 10^6$ W/cm$^2$.

28. The method of claim 24, wherein the probe electromagnetic radiation is delivered from a coherent source.

29. The method of claim 24, wherein the at least one defect comprises a series of defects arranged to form a waveguide.

30. The method of claim 24, wherein the at least one defect forms a cavity.

31. The method of claim 24, wherein the detecting step comprises detecting a heterodyne signal.

32. The method of claim 24, wherein the detecting step comprises detecting a heterodyne signal produced from heterodyned optical Kerr effect.

33. The method of claim 1, wherein the periodic variation is sufficient to define a complete photonic bandgap, the complete photonic bandgap defining a frequency range for which electromagnetic radiation at a frequency within the frequency range of the complete photonic bandgap cannot propagate within the photonic crystal along any direction away from the at least one defect.

34. The system of claim 17, wherein the periodic variation is sufficient to define a complete photonic bandgap, the complete photonic bandgap defining a frequency range for which electromagnetic radiation at a frequency within the frequency range of the complete photonic bandgap cannot propagate within the photonic crystal along any direction away from the at least one defect.

35. The method of claim 24, wherein the periodic variation is sufficient to define a complete photonic bandgap, the complete photonic bandgap defining a frequency range for which electromagnetic radiation at a frequency within the frequency range of the complete photonic bandgap cannot propagate within the photonic crystal along any direction away from the at least one defect.

* * * * *